United States Patent [19]

Schuele et al.

[11] Patent Number: 4,562,722
[45] Date of Patent: Jan. 7, 1986

[54] IMPACT WRENCH TORQUE CALIBRATOR

[75] Inventors: Donald E. Schuele, Lyndhurst; John W. Wilhelm, Jr., Moreland Hills, both of Ohio

[73] Assignee: Skidmore-Wilhelm Manufacturing Co., Cleveland, Ohio

[21] Appl. No.: 639,576

[22] Filed: Aug. 10, 1984

[51] Int. Cl.[4] .......................... G01L 5/24; G01L 25/00
[52] U.S. Cl. ............................................ 73/11; 73/1 C
[58] Field of Search ...................... 73/11, 1 C, 862.08, 73/862.35

[56] References Cited

U.S. PATENT DOCUMENTS 2,795,131  6/1957  Booth ..................................... 73/1 C
4,150,559  4/1979  Levy ....................................... 73/1 C
4,470,312  9/1984  Thompson ........................... 73/1 C X

FOREIGN PATENT DOCUMENTS 0024651  2/1980  Japan ................................. 73/862.08
0442391  9/1974  U.S.S.R. ........................... 73/862.08

Primary Examiner—Charles A. Ruehl
Attorney, Agent, or Firm—Body, Vickers & Daniels

[57] ABSTRACT

A torque calibrator allowing the accurate calibration of impact type wrenches. The calibrator measures the displacement of a heavy fixed beam in its natural oscillation mode. The beam has a long period of natural oscillation and an elastically soft segment preventing generation of rebound signals sometimes seen in stiff systems.

16 Claims, 9 Drawing Figures

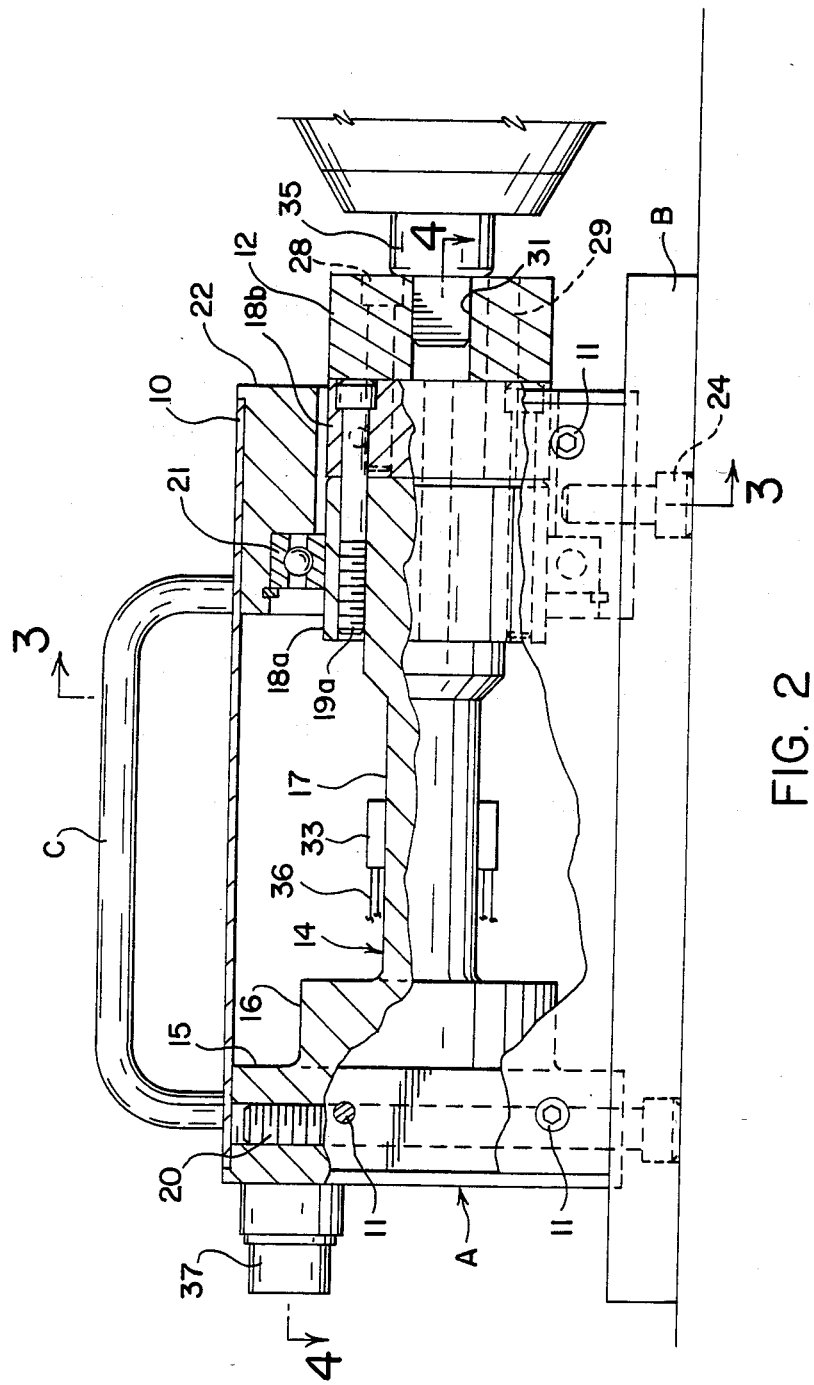

IMPACT WRENCH TORQUE CALIBRATOR

BACKGROUND OF THE DISCLOSURE

This invention pertains to the art of measurement of torque applied as a series of sharp impulses by an impact wrench or the like.

The invention is particularly applicable to the calibration of hand held impact wrenches and the like.

The fastening together of parts is one of the most common of manufacturing operations. One often used means of fastening parts together is the use of threaded fasteners. Nuts and bolts, nuts and threaded studs, and other threaded fasteners are used in a wide variety of manufacturing operations. Many different types of threaded fasteners and tools for applying threaded fasteners have been developed to meet the needs of manufacturers in these operations.

For threaded fasteners to reliably perform in holding parts together, tension must be developed in the body and thread length of a bolt, stud or the like. This tension holds opposing surfaces of the threaded nut and bolt tightly together and, in many cases, slightly deforms the threads. High frictional forces are maintained preventing the nut and bolt from unscrewing from one another.

Tension is normally applied to the body and thread of a bolt by rotating the nut with respect to the bolt and continuing tightening rotation until appropriate bolt tension is achieved. However, in most manufacturing operations this bolt tension cannot be directly measured or controlled. Instead, the torque, that is, the rotational force causing the bolt or nut to rotate with respect to the other, is often measured or controlled.

Hand held, unpowered torque wrenches or continuously acting powered torque wrenches are often used to apply the tightening torque. These tools can be calibrated on existing calibration units without extreme difficulty. Therefore, a uniform, known torque can be applied to fasteners by using calibrated wrenches. Application of such a uniform known torque to fasteners is essential in manufacturing operations to be certain that fasteners will remain fastened.

Many manufacturing and other industrial organizations use powered impact wrenches to apply nuts to bolts and the like.

Powered impact wrenches apply torque as a series of sharp rotational blows. Short, sharp periods of torque having a high instantaneous value are applied to the nut ot bolt through a rigid driving head. Measuring and controlling the torque applied to a fastener by an impact wrench has been difficult in the past.

Past methods and apparatus for testing and calibrating impact wrenches have inherent inaccuracies of several kinds. Some methods use a mechanical portion having two parts such as a nut and a stud which move with respect to one another. Torque is applied to the nut which rotates on the stud. The tension imposed on the stud is then measured. Errors are introduced as torque is not directly measured. The state of lubrication of the mating threads on the test nut and bolt will affect the tension produced on the bolt by a given torque and therefore cause changes in readings from on test to another. Wear of the mating threaded surfaces will also cause inaccurate readings. Changes in lubrication, wear and other factors affecting the friction between the mating threads will cause errors. The same torque apped to the same calibrator at different times will result in a different reading. Because of this, exact calibration of systems cannot be held for appreciable periods of time.

Another existing means of measuring torque is by the use of strain gauges on a small body to which the torque is applied. As the torque is applied, the body undergoes torsion and the resistance of the strain gauges changes in accordance with this torsion providing a signal representative of the torque applied. This is acceptable for wrenches and devices applying a constant steady torque or a slowly varying torque. However, such systems do not accurately reflect the true nature of the impulse applied by an impact wrench. When used with an impact wrench, the meter usually measures displacement caused directly by the torque exerted by the impact wrench which is dependent upon the mass, moment of inertia and coupling of the entire system. Errors are introduced by inconsistent coupling and resonances within the mechanical system. Moreover, the mass of the total system subject to torque is sometimes significantly different for different wrenches resulting in inaccuracies.

Because of the inherent inaccuracies in strain gauge type instruments when used with impact wrenches, use of the instruments with impact wrenches was discouraged.

It has also been found that the hammer-like mechanism which produces pulses of torque in typical impact wrenches sometimes causes a rebound torque in the driving portion of the wrench and the elements driven by the wrench. Such rebounds are seen as torque applied in the direction opposite of desired torque. The rebound torque produces an erratic spurious signal which interferes with torque measurement in rigidly coupled systems.

The present invention eliminates all of the lubrication, wear and frictional problems of torque measuring devices having movable interacting parts and overcomes the inherent inaccuracies of the prior art by use of a unitary mechanical structure not subject to frictional inconsistencies or unwanted resonances.

In accordance with the present invention, a torque wrench calibrator is provided comprising a beam having a stationary end plate, a rod portion, a free end portion, and an adapter fixed to the free end portion to receive the driving portion of an impact wrench. At least one strain gauge is fixed to the rod portion of the beam oriented to respond to angular displacement of the rod portion by changing its electrical resistance. The maximum change in the resistance of the strain gauge is read by an electronic peak detector. Importantly, the mass and cross-section of the beam, when coupled with the driving portion of an impact wrench, has an effective moment of inertia such that its natural period of oscillation is significantly greater than the duration of torque impulses applied by the wrench. The maximum displacement of this oscillation is directly proportional to the torque applied and is read by the peak detector.

Further in accordance with the invention, the beam free end portion is comprised of two rigidly connected pieces having different moduli of elasticity, and different damping characteristics, such as steel and aluminum, such that unwanted rebounding is eliminated.

Yet further in accordance with the invention, an electronic reading circuit is provided comprising an amplifier receiving an input from the strain gauges disposed upon the beam and having an output signal proportional to the resistance of the strain gauges; a peak detector recognizing the highest value of the output signal of the amplifier and holding this value; and, a display means displaying this value which is proportional to the value of the impulse of torque applied by the power tool being calibrated.

Yet further in accordance with the invention, a zeroing and compensation circuit is provided which will return the peak detector to its initial condition and compensate for any drift or inaccuracies in the circuit thereby automatically providing an accurate zero starting point for measuring.

Still further in accordance with the invention, a pulse counting circuit is provided which will count the number of pulses per minute applied to the calibrator by an impact wrench and display this number.

The pulse counting circuit includes means for generating a reference signal equal to a fraction of the value held in the torque measuring peak detector and means comparing this reference signal to the instantaneous torque signal, thereby creating an output consisting of a pulse for each pulse of torque. Because two signals based on the value of torque applied are compared, the counter accurately detects and counts impulses over a wide range of torque values.

Yet further in accordance with the invention, a method of calibrating impact wrenches is provided in which a torque is applied as an impulse or a series of impulses to a unitary beam having a long period of natural oscillation such that the beam responds to short periods of torque by oscillating at its natural frequency; measuring the maximum angular displacement caused by the natural oscillation of the beam and displaying a number proportional to this maximum displacement.

The principal object of the invention is the provision of a new and improved impact wrench calibrating device which accurately measures the value of impulses of torque applied.

Another object of the invention is the elimination of frictional error elements in the measurement of torque applied by an impact wrench.

Another object of the invention is the elimination of rebound torque from an impact wrench torque measuring apparatus.

Yet another object of the invention is the provision of an impact wrench calibrator which can measure the value of an impulse applied by an impact wrench, the number of impulses per minute applied by an impact wrench, and the instantaneous torque applied by a continuous type of torque wrench all in one compact instrument.

Still another object of the invention is the provision of an impulse counter which will accurately count impulses over a wide range of impulse value or strength.

Yet another object of the present invention is the provision of an impact wrench calibrator which accurately measures torque applied by various wrenches having different driving portion mass and/or geometry.

The invention may take physical form in certain parts and arrangements of parts, a preferred embodiment of which will be described in detail in this specification and illustrated in the accompanying drawings which form a part hereof and wherein:

FIG. 2 is a cross-sectional view taken along line 2—2 of FIG. 1 and also showing the driving portion of an impact wrench engaging the device;

Figure 1:
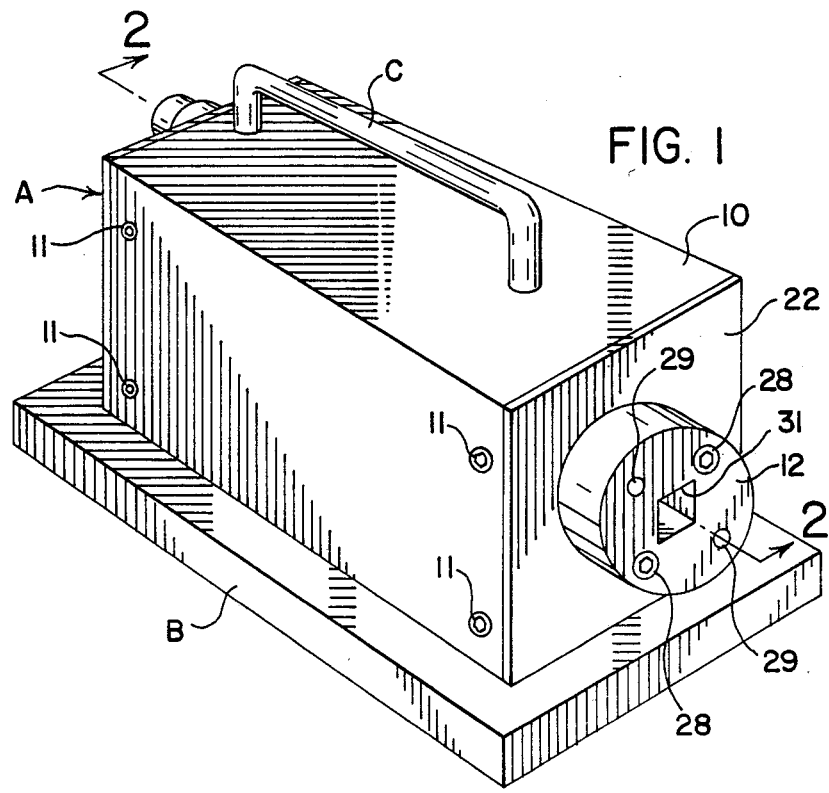
FIG. 1 is a perspective view illustrating the mechanical portions of the invention on a mounting plate in accordance with the preferred embodiment of the invention.

Referring now to the drawings wherein the showings are made for the purposes of illustrating a preferred embodiment of the invention only and not for the purposes of limiting same, FIG. 1 shows impact wrench calibrator A firmly fixed to a mounting plate B. Mounting plate B provides means for firmly fixing the impact wrench calibrator in position so that torque may be applied through adapter 12 without moving the entire structure of the impact wrench calibrator.

Handle C is provided so that the impact wrench calibrator may be moved easily. Cover 10 is fixed to the calibrator by mounting screws 11 and protects the device.

Beam 14 can be best seen in FIG. 2. The beam is a unitary structure fabricated from a single piece of steel and a single piece of aluminum. The steel portion of beam 14 is formed into stationary end plate 15, intermediate portion 16, rod portion 17, and steel free end portion 18a. Stationary end plate 15 is rigidly fixed to mounting plate B by heavy bolts 20. Stationary end plate 15 has a flat bottom over its entire width and length to facilitate rigid interconnection to mounting plate B. Intermediate portion 16 and rod portion 17 both have circular cross-sections.

Free end portion 18 is fabricated from two separate pieces of metal having similar circular cross sections and rigidly interconnected. Steel free end portion 18a is part of the same piece of steel forming stationary end plate 15, intermediate portion 16 and rod portion 17. Aluminum free end portion 18b is rigidly connected to steel free end portion 18a by machine bolts 19a and pins 19b. Because of this rigid connection, free end portion 18 behaves as a unitary element having segments with different elasticity characteristics in response to the application of torque. The more elastic, softer characteristic of aluminum free end portion 18b, which is near the point of application of torque, prevents rebound torque pulses sometimes seen in rigidly connected, stiff systems.

Rod portion 17 has a significantly, smaller cross-section than adapter 12, intermediate portion 16 and free end portion 18. Rod portion 17 will therefore undergo significantly more torsion in response to a given torque load than the remaining beam elements.

Steel free end portion 18a is restrained from movement, other than rotation, by ball bearing 21 mounted in front housing 22. Front housing 22 is in turn rigidly mounted to mounting plate B by heavy bolts 24.

Figure 3:
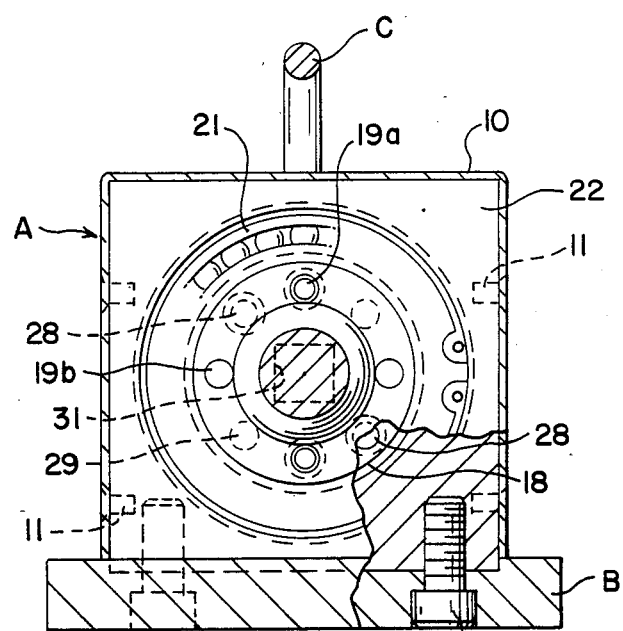
FIG. 3 is a cross-sectional view of the device taken along line 3—3 of FIG. 2.
Figure 4:
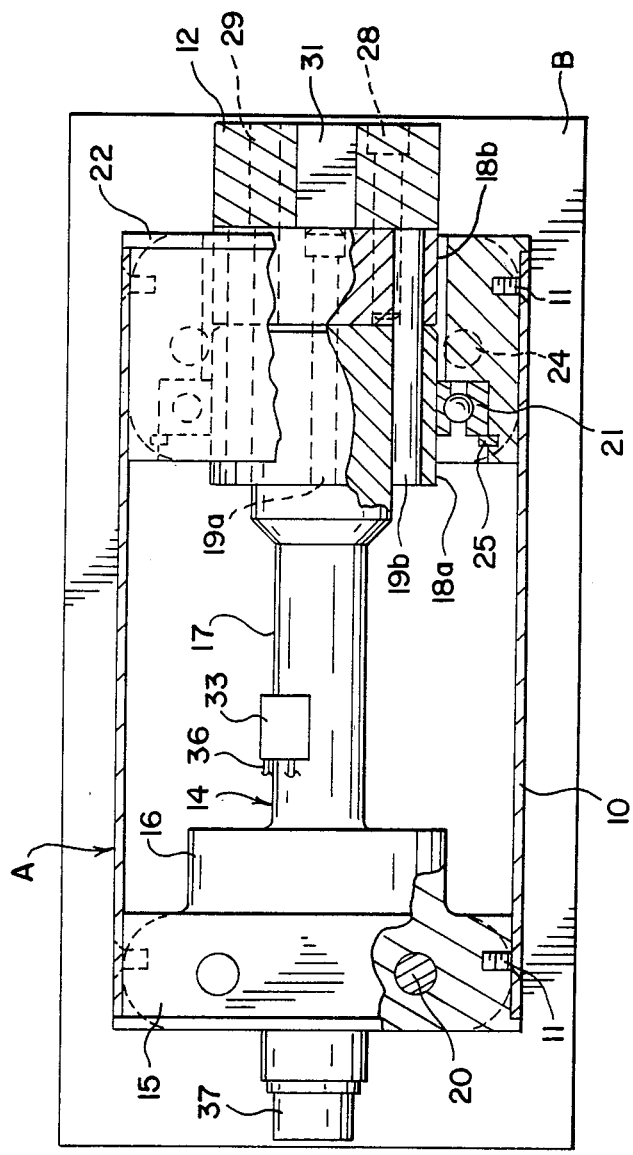
FIG. 4 is a cross-sectional view of the device taken along line 4—4 of FIG. 2.

As can be seen in FIGS. 2, 3, and 4, adapter 12 is rigidly interconnected with aluminum free end portion 18b by means of two machine screws 28 and two dowel pins 29 providing four points of interconnection and preventing motion of the adapter relative to the free end portion 18. Aperture 31 of adapter 12 is sized to snugly accept the driving portion 35 of the impact wrench to be tested or calibrated. Adapter 12 can be replaced by a different adapter having a larger or smaller center aperture 31 to accept impact wrenches of different size. Of course, each of these adapters must be hardened to prevent deformation of the adapter center portion by repeated applications of torque by impact wrenches.

Strain gauge assembly 33 (shown schematically) is conventionally mounted near the center of rod portion 17 in an orientation to respond to torsion upon the rod. Strain gauge assembly 33 is fabricated of two pairs of strain gauges such as are available from Micro-Measurements Company and identified as Model No. EA-06-062-TV-350. The strain gauge assembly 33 is mounted with Eastman 910 cement or epoxy type cement in accordance with normal practice. The strain gauge assembly is also coated with a silicone rubber or other sealing material to protect it from the elements, humidity and other environmental factors which could affect its life and accuracy. The coating is not shown in the drawings for purposes of clarity.

The resulting structure is a unitary beam 14 having its stationary end plate 15 firmly held in place through mounting plate B and its free end portion 18 and adapter 12 free to rotate and ready to rigidly accept the driving portion 35 of an impact wrench.

THEORY AND MECHANICAL OPERATION

In operation the driving portion 35 of an impact wrench applies impulses of torque to the adapter 12. These impulses are of short duration and alternate with relatively long undriven periods. Because the driving portion 35 is rigidly fixed to the adapter 12 which is rigidly fixed to beam 14; the beam 14, the adapter 12, and the driving portion 35 of the impact wrench act as a unitary structure in responding to each impulse. The impulse imparts an initial angular velocity to the beam 14 at the end of the short duration of the impulse. The beam structure responds to this impulse by oscillating in its natural oscillation mode. The oscillation is an angular displacement oscillation and results in strain gauge assembly 33 sensing rotation first in one angular direction and then in the other angular direction. The oscillation will completely decay due to inherent damping within the system prior to application of the next impulse of torque.

The period of this natural oscillation is dependent only on the moment of inertia and torsional constant of the unitary structure. The period remains constant regardless of the strength of the impulse of torque applied. The moment of inertia and torsional constant of beam 14 and adapter 12 dominate over the less massive driving portion 35 of the impact wrench. The period of natural oscillation of the unitary structure of beam 14, adapter 12, and driving portion 35 is fixed by the characteristics of beam 14 and adapter 12 at about 1 millisecond, which is more than eight times the duration of torque application of typical impact wrenches. This relatively long term oscillation will cause a large amount of rotation in comparison to the negligibly small, short term rotation immediately caused by the impulse of torque applied by an impact wrench. Theoretically, where the duration of torque pulses is less than one tenth the period of natural oscillation of the beam, adapter and driving portion structure, the maximum natural mode oscillation rotation is equal to the value of the impulse divided by the square root of the product of the moment of inertia and torsional constant of the beam, adapter, driving portion structure to within a one and one half percent maximum error.

As the moment of inertia and torsional constant of the system are dominated by the properties of the beam 14, and will remain constant, the maximum amplitude of the oscillation rotation is directly proportional to the value of the impulse applied; irrespective of the particular characteristics of the impact wrench under test. A very accurate measurement results from selecting a period of natural oscillation for the unitary structure of beam 14, adapter 12, and driving portion 35 of eight times the duration of impulses expected or greater.

The natural oscillations described above are sensed by strain gauge assembly 33. Strain gauge assembly 33 (FIG. 6A) is comprised of two matched pairs of strain gauges SG1, SG2 and SG3, SG4 connected in a conventional Wheatstone bridge configuration to measure torsion. Resistors R1 and R2, a single film resistor package, are trimmed to remove any large offset seen in the bridge. The Wheatstone bridge is energized with plus and minus five volts D.C. power through bridge terminals BT1 and BT3. The bridge output is a voltage signal having a value representing the angular displacement of beam 14 from its rest position and is presented at bridge terminals BT2 and BT4. As the bridge is sensing an oscillating motion, this will be an oscillating signal.

The circuits shown in FIGS. 5–8 interact to process the data provided by the Wheatstone bridge at BT1 and BT2.

THE IMPULSE READING CIRCUIT

The oscillating signal from bridge terminal BT2 and BT4 is applied to instrumentation amplifier integrated circuit U101 as a bipolar signal at pins 10 and 5. The positive output terminal of the strain gauge bridge is connected to the negative input of instrumentation amplifier U101 causing the amplifier to invert the signal. The instrumentation amplifier U101 provides voltage gain as determined by the gain resistor R101 connected between pins 1 and 4.

The output signal of instrumentation amplifier U101 is provided at both interconnection point PT1 and, through a mild filtering circuit, composed of resistor R103 and capacitor C101, to the noninverting input of operational amplifier U102. As instrumentation amplifier U101 has inverted the strain gauge bridge signal, a positive going signal portion from the strain gauge bridge applies a negative going signal at the noninverting input of operational amplifier U102. This signal is otherwise proportional to the displacement of beam 14.

Operational amplifier U102 and operational amplifier U103 are interconnected to form a peak detector detecting only negative going pulses. Positive going input pulses cause a positive output from operational amplifier U102 which is passed by diode D101 but not passed by diode D102. Thus, no input signal is applied to operational amplifier U103 and its output will remain at zero.

A negative going signal applied to the noninverting input of operational amplifier U102 causes a negative output from this operational amplifier. This negative signal is passed by diode D102 but not diode D101. The negative going signal is applied to the noninverting input of operational amplifier U103. The output of operational amplifier U103 is fed back to the inverting input of U103 which therefore has an output value which tracks the voltage applied to the noninverting input. The output of operational amplifier U103 is also fed back through resistor R104 to the inverting input of operational amplifier U102 and capacitor C128. This negative feedback assures accurate tracking of the input by the peak detector.

Operational amplifier U103 is selected to have a very low input bias current requirement and diode D102 is selected to have a very low leakage current. The most negative voltage applied through diode D102 at the noninverting input of operational amplifier U103 is therefore held on capacitor C102. The negative going output of operational amplifier U103 tracks the noninverting input of operational amplifier U102 to its most negative value and holds that most negative value until cleared. This held value is proportional to the maximum angular displacement of beam 14 in a given test.

The output of this peak detector circuit is passed through resistor R106 to the inverting input of operational amplifier U104. The values of feedback resistor R107 and resistor R106 associated with U104 are selected such that the operational amplifier is a unitary gain inverting buffer. Operational amplifier U104 inverts the value applied at its inverting input and provides its output to a voltage divider bridge comprised of R108, potentiometer P102 and resistor R110, which is connected to ground. The wiper contact of P102 is adjusted to provide gain control of the output signal which is picked up at the wiper terminal and fed to terminal connection point PT2 and thus made available to the display circuitry shown in FIG. 7. A voltage proportional to the highest instantaneous displacement of beam 14 is provided and held at terminal point PT2.

Figure 7:
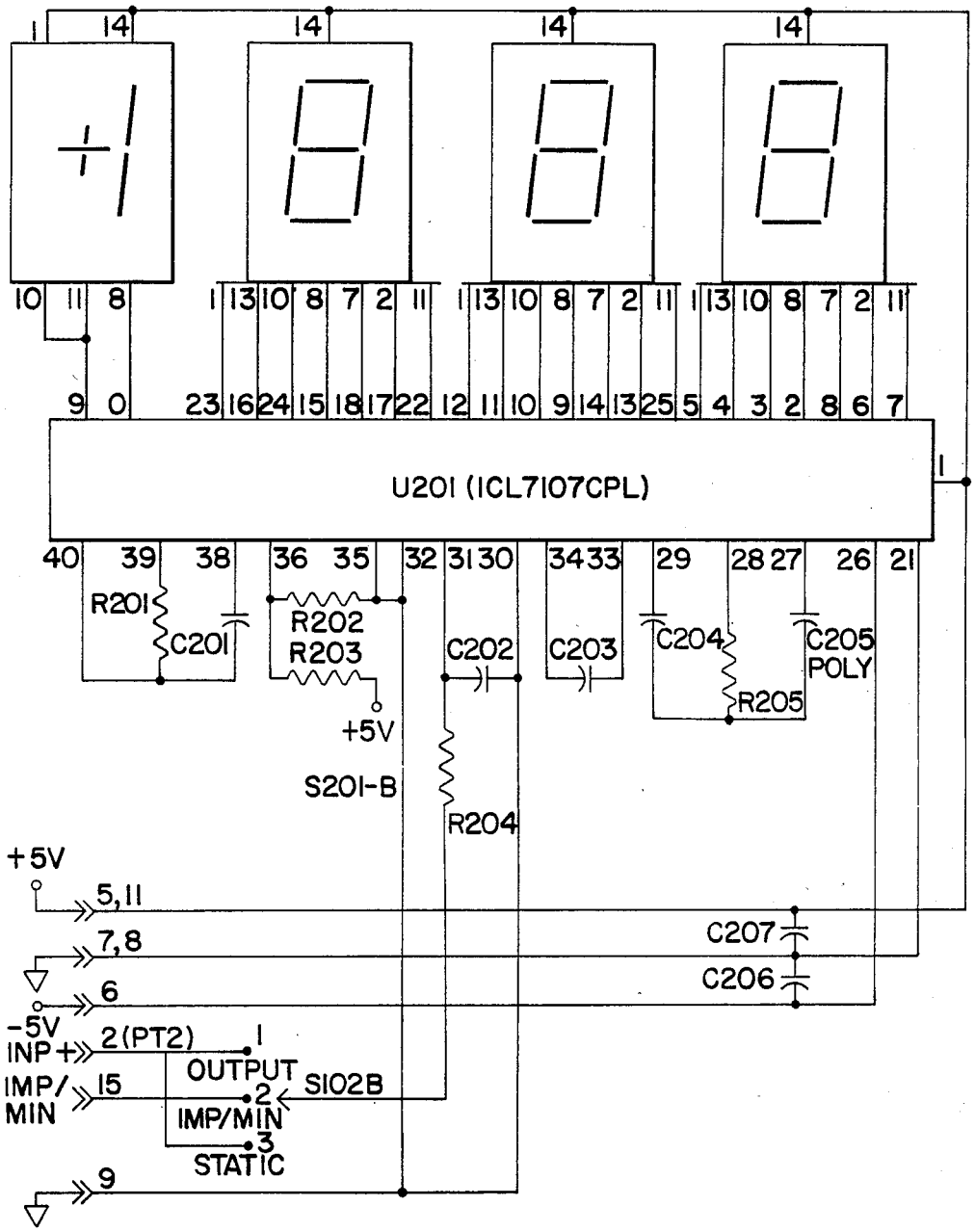
FIG. 7 is a schematic diagram of the display portion of the circuit of the preferred embodiment; and, FIG. 8 is a schematic diagram of the power supply used in the preferred embodiment.

Terminal point PT2 is also shown in FIG. 7 illustrating the display circuitry. The output signal at point PT2 is connected through resistor R204 to pin 31 of display driver U201 when switch S201 is in the "output" position. Display driver display DSP voltage at point PT2 and directly drives display DSP which, thus, shows a digital representation proportional to the largest displacement of beam 14 during the current test. This is directly proportional to the value of the impulse applied by an impact wrench. The gain at potentiometer P102 is adjusted such that the number displayed is the value of torque applied in the units selected.

Figure 6A:
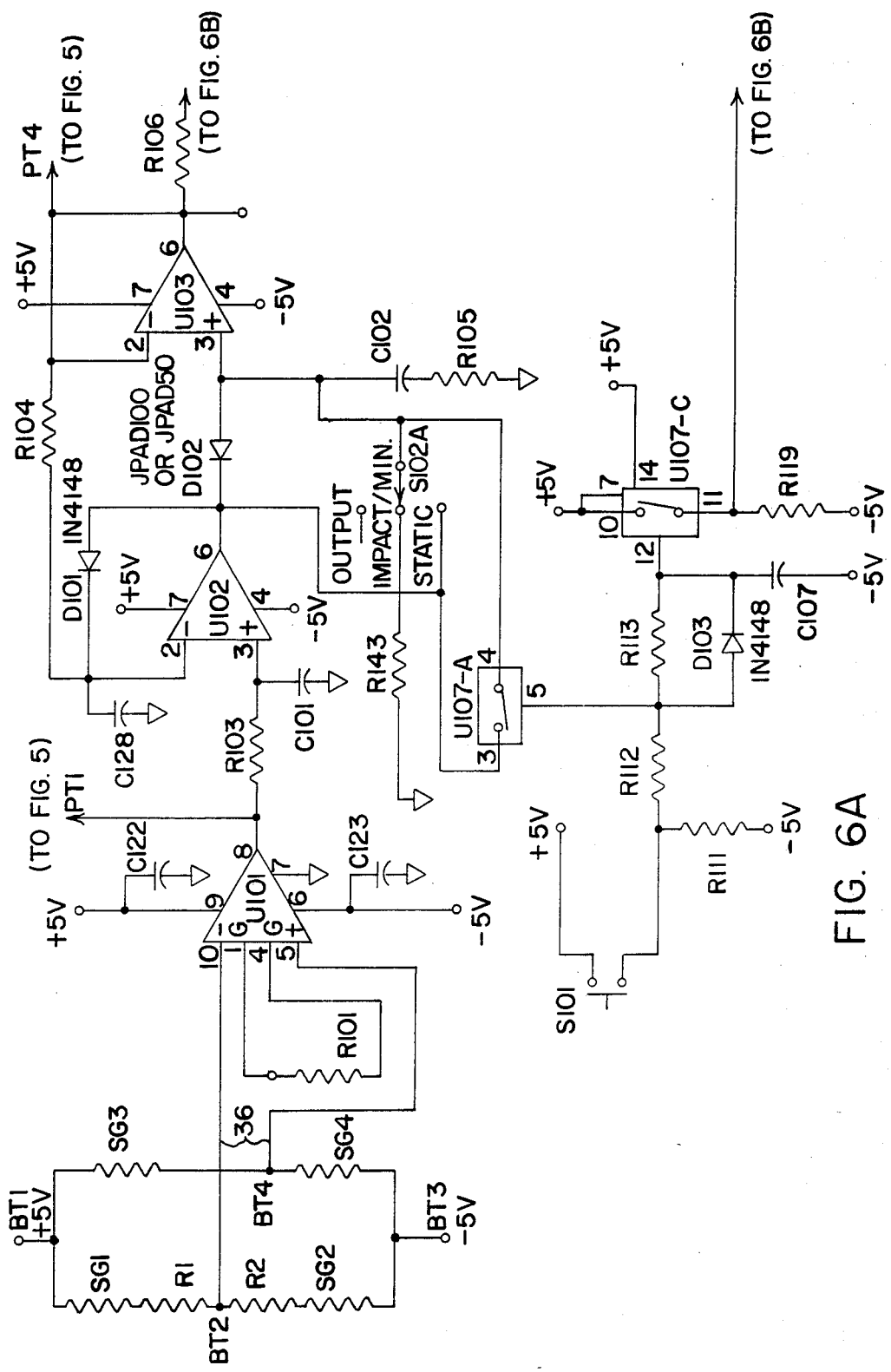
FIGS. 6A and 6B are a schematic diagram of the torque measuring portion of the electronic circuit of the preferred embodiment.
Figure 6B:
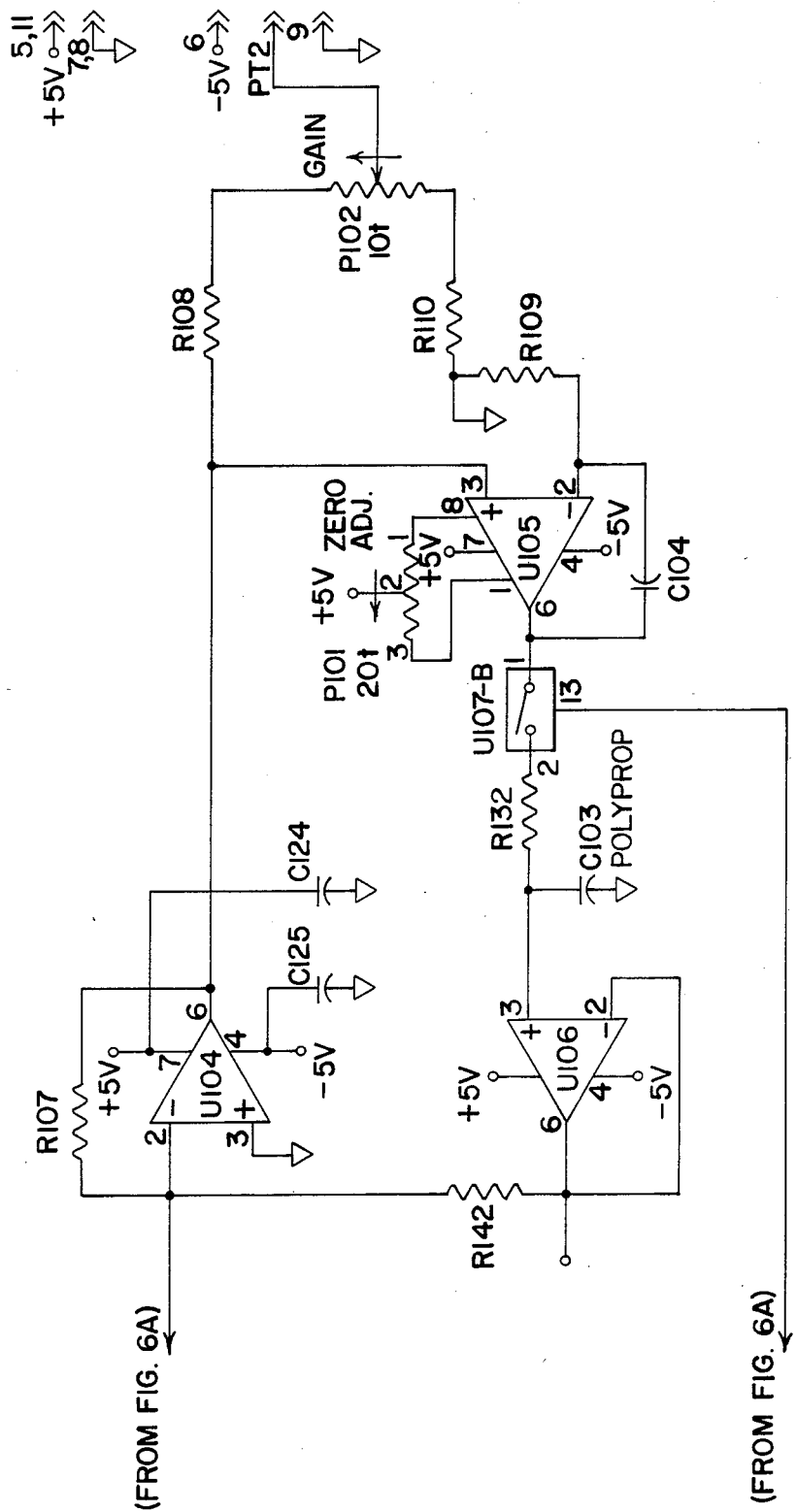

A zeroing circuit is provided to remove charge from the charge collecting areas of the circuit allowing one to start a reading for a new test. Switch S101, shown in FIG. 6A, is a momentary contact, push button switch. In the normal position resistor R111, which is connected to the minus 5 volts power supply, passes current from resistors R112 and R113 and holds the input of solid state switches U107-A and U107-C low. Resistor R119 holds the input of solid state switch U107-B low. The switches are therefore open.

When switch S101 is momentarily pressed, a positive 5 volt signal is applied through resistor R112 to solid state switch U107-A and through a delay circuit comprised of resistor R113, capacitor C107 and diode D103 to solid state switch U107-C closing both switches. Solid state switch U107-A shorts out diode D102 and discharges capcitor C102. The output of the peak detector is reduced to a very low value. This may be slightly offset from zero volts. A circuit is provided to compensate for this offset and any other zero level errors in the circuit.

During the zeroing operation, solid state switch U107-C is also closed by switch S101. Solid state switch U107-C applies a positive voltage to the input of solid state switch U107-B, closing it. Solid state switch U107-B closes a feedback circuit comprised of operational amplifier comparator U105 and operational amplifier U106.

The output of inverter operational amplifier U104, which is also the output of the entire torque reading circuit prior to gain adjustment, is applied to the noninverting input of precision operational amplifier coparator U105. The inverting input of operational amplifier comparator U105 is connected to ground through resistor R109 providing a zero reference level. Thus, comparator U105 compares the output of amplifier U104 to ground reference. The output of comparator U105 represents the difference between the output of amplifier U104 and zero. This output is fed back to the inverting input of comparator U105 through capacitor C104 which integrates any small different between the output of operational amplifier U104 and zero volts. This integrated difference is fed through solid state switch U107-B and resistor R132 to storage capacitor C103 and operational amplifier U106. Amplifier U106 is a unity gain buffer isolating the level stored on capacitor C103 and applying an identical level to the inverting input of operational amplifier U104 through resistor R142. This level compensates for the peak detector zero offset.

When switch S101 is released, solid state switches U107-A, U107-B and U107-C all open. U107-B will open last because of the delay provided by resistor R113, capacitor C107 and U107-C. Capacitor C103 is then isolated and will hold the previously stored zero offset level, thus, compensating operational amplifier U104 and providing an accurate and stable zero output at the beginning of a test sequence.

THE CALIBRATE-STATIC FEATURE

Switch S102 is a ganged switch having two sets of contacts S102-A and S102-B. The switch sets the function of the circuits at "impacts/minute", "output" or "static" in the "static" position, the device is calibrated or steady loads, as opposed to impact loads, are measured. With switch S102-A in the "static" position, contacts S102-A of the switch shorts out diode D102 in the peak detector portion of the circuit. Capacitor C102 then no longer holds the highest value of torque applied to the tester during a test sequence. Instead, the output of the peak detector follows its input and thus, the torque applied, as it increases and decreases. Display DSP directly displays this time varying signal as it increases and decreases.

The device can be calibrated by first depressing and releasing the zero switches 101 while the torque calibrator is unloaded to zero the circuit. A known torque is then applied to the calibrator and the gain (potentiometer P102) adjusted until this known torque is displayed at the display DSP.

THE IMPACTS PER MINUTE FEATURE

Figure 5:
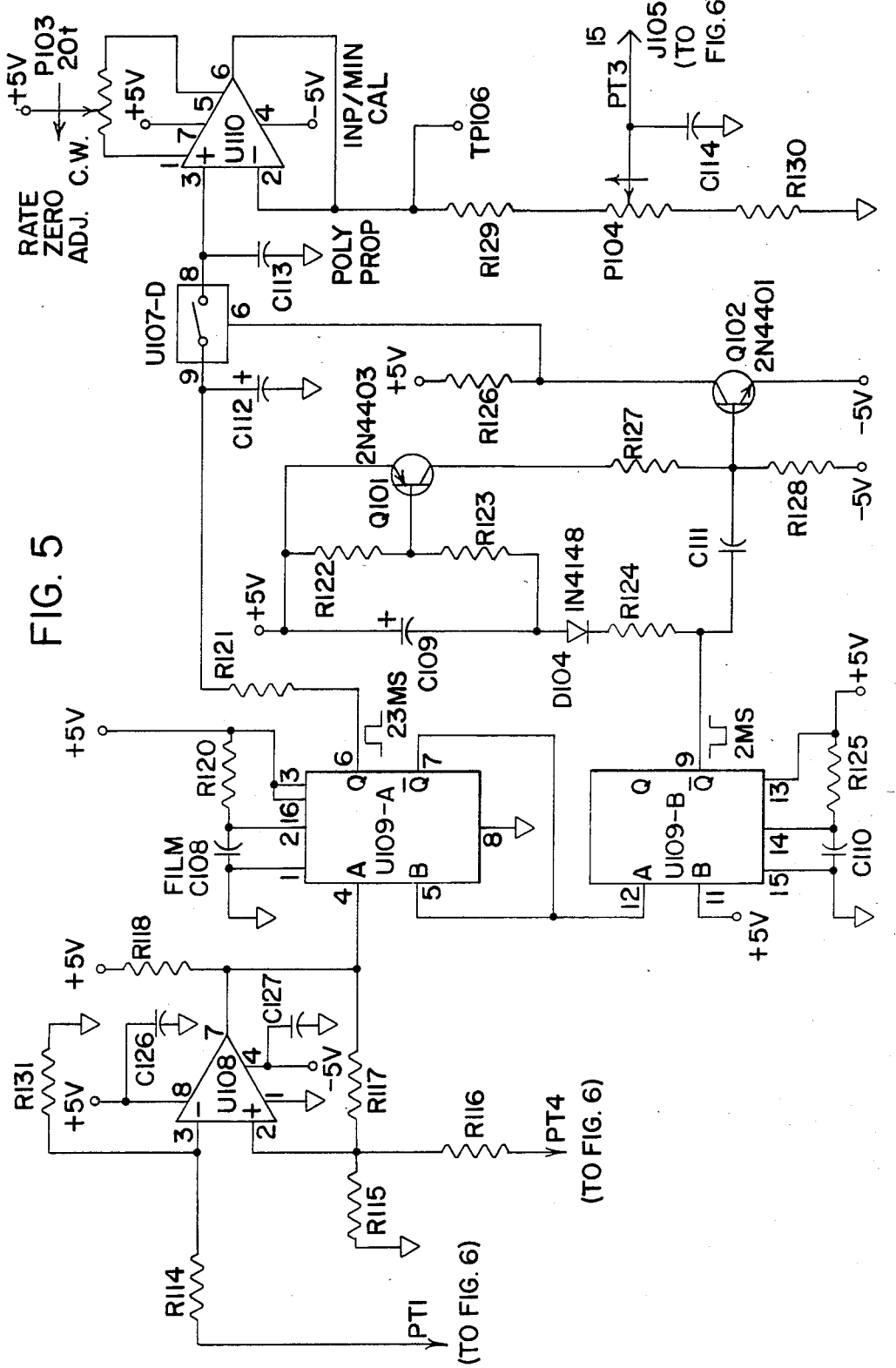
FIG. 5 is a schematic diagram of the impulse per minute measuring portion of the electronic ciruit of the preferred embodiment of the invention.

FIG. 5 is a schematic drawing of the circuit for counting the number of impacts supplied to the calibrator per minute by an impact wrench or similar device. To use the impact per minute feature, switch S102 is put in the "IMP/MIN" position.

As in the "output" mode, when an impact wrench is applied to the front of the device and torque is applied to beam 14, the strain gauge bridge made up of strain gauges SG1, SG2 and reference resistors R1, R2 responds with an oscillating output voltage to each impulse of torque. The signal is a series of oscillations followed by a zero level period for each impulse. This signal is amplified by instrumentation amplifier U101 (FIG. 6a). The output of instrumentation amplifier U101 is applied through terminal point PT1 and resistor R114 to the inverting input of comparator operational amplifier U108.

The negative peak value of the signal supplied to the inverting input of operational amplifier U108 is supplied from the output of peak detector operational amplifier U103 (FIG. 6) through connection point PT4 to a voltage divider comprised of resistors R116 and R115. The divided peak voltage is then applied to the non-inverting input of operational amplifier U108. When a series of oscillations caused by an impulse is applied to the inverting input of operational amplifier U108, it is compared to the divided peak level at the non-inverting input and a series of rectangular output pulses corresponding to the input oscillations is generated at the output.

Resistor R117 provides a small amount of positive feedback for the operational amplifier. Resistor R131 connects the inverting input of operational amplifier 108 to circuit ground to drain off any D.C. level. Resistor R143 is connected between peak detector storage capacitor C102 and ground by switch S102 in the impacts per minute mode allowing the charge stored in the capacitor to slowly drain off.

The rectangular pulses created by amplifier U108 are applied to monostable multivibrator U109-A at pin 4 initiating an output pulse at pin 6. Capacitor U108 and resistor R120 are selected to determine the "on" time for the monostable multivibrator U109-A which is 23 milliseconds. Monostable multivibrator U109-A will remain on for 23 milliseconds following the last of the series of pulses created by amplifier U108 in response to an input oscillation caused by an impulse from an impact wrench. This output is provided to an averaging circuit comprised of resistor R121 and capacitor C112. As capacitor C112 is large, it will slowly charge toward the output potential of monostable multivibrator U109-A and slowly discharge once the output goes to its low state. The averaging circuit does not fully discharge during the interval between impulses. The level of charge retained depends on the impulse rate.

The output of the averaging circuit at capacitor C112 is connected through solid state switch U107-D to a much smaller sampling capacitor C113. Circuitry is provided to trigger the close of analog switch U107-D at the same time near the end of each 23 millisecond output pulse generated by monostable multivibrator U109-A. Thus, C113 is charged at the same relative point in the charge-discharge cycle of capacitor C112 for each pulse and maintains a uniform value for a given impact wrench rate.

The voltage on capacitor C113 is buffered by operational amplifier U110 and applied to a voltage divider comprised of resistors R129, R130 and potentiometer P104. Potentiometer P104 is adjusted to calibrate the output of the circuit. Potentiometer P103 provides zero adjustment. The output of potentiometer P104 is slightly filtered by capacitor C114 and provided through connection point PT3 to the display switch S102-B to the input of the display driver U201 when S201 is in the "IMP/MIN" position. The signal provided at PT3 is a voltage equal to the frequency of impacts applied by the impact wrench.

Solid state switch U107-D must be precisely controlled so that the averaging circuit made up of resistor R121 and capacitor C112 can be consistently read at the same point in its charge-discharge cycle. This is accomplished by connecting the negative going output (Pin 7) of monostable multivibrator U109-A to the positive edge trigger (Pin 12) of monostable multivibrator U109-B. At the end of the 23 millisecond output pulse of U109-A, a positive going edge is presented to monostable multivibrator U109-B which triggers a negative going 2 millisecond pulse at pin 9 of monostable multivibrator U109-B.

Capacitor C110 and resistor R125 are selected to provide this 2 millisecond output pulse length.

The leading edge of the negative pulse generated by monostable multivibrator U109-B is passed through capacitor C111 to the base of transistor Q102 turning it off. This allows resistor R126, connected to the 5 volts supply bus, to turn solid state switch U107-D on, opening the sampling period in which capacitor C112 charges capacitor C113.

The negative pulse produced by monostable multivibrator U109-B also drains capacitor C109 through diode D104 and resistor R124 and, thus, turns transistor Q101 on by draining its base through resistor R123. Current is conducted through transistor Q101 to a voltage divider comprised of resistors R127 and R128 applying a forward bias current to transistor Q102. This turns Q102 back on and holds it on for the remaining duration of the pulse forming the output of monostable multivibrator U109-B. Switch U107-D is thereby opened, ending sampling.

When monostable multivibrator U109-B times out, its output again goes positive and diode D104 is reverse biased. Resistor R124 is therefore removed from the base circuit of transistor Q101. Current is conducted through resistors R122 and R123 charging capacitor C109. As the capacitor charges, the potential at the base of the transistor Q101 rises slowly as determined by the time constant of the RC circuit comprised of resistors R122 and R123 and capacitor C109. This time constant is sufficiently long that transistor Q101 is maintained in the "on" condition for the entire duration of application of pulses to the circuit by the impact wrench. The voltage divider network comprised of resistors R127 and R128 will continue to supply forward biasing current to transistor Q102 for the duration of the test interrupted only by short pulses delivered from monostable multivibrator U109-B through capacitor C111.

The effect of the transistor circuit described above is that of a sample and hold circuit. Solid state switch U107-D is closed for a very short period of time at a precisely selected position within the chargedischarge cycle and maintains a constant voltage on capacitor C111 which is proportional to the frequency of impact applied by the impact wrench.

THE DISPLAY CIRCUITRY

The output signals of both the torque measuring circuit (FIGS. 6A and 6B) and the impacts per minute measuring circuit (FIG. 5) are applied through terminal points PT2 and PT3 to the input of display driver U201 having an externally adjusted reference and other conventional external circuit elements connected to it in accordance with the manufacturers recommendations. The display driver directly drives segments of display DSP which displays a digital representation of the voltage applied to it through PT2 and PT3.

THE POWER SUPPLY

Figure 8:
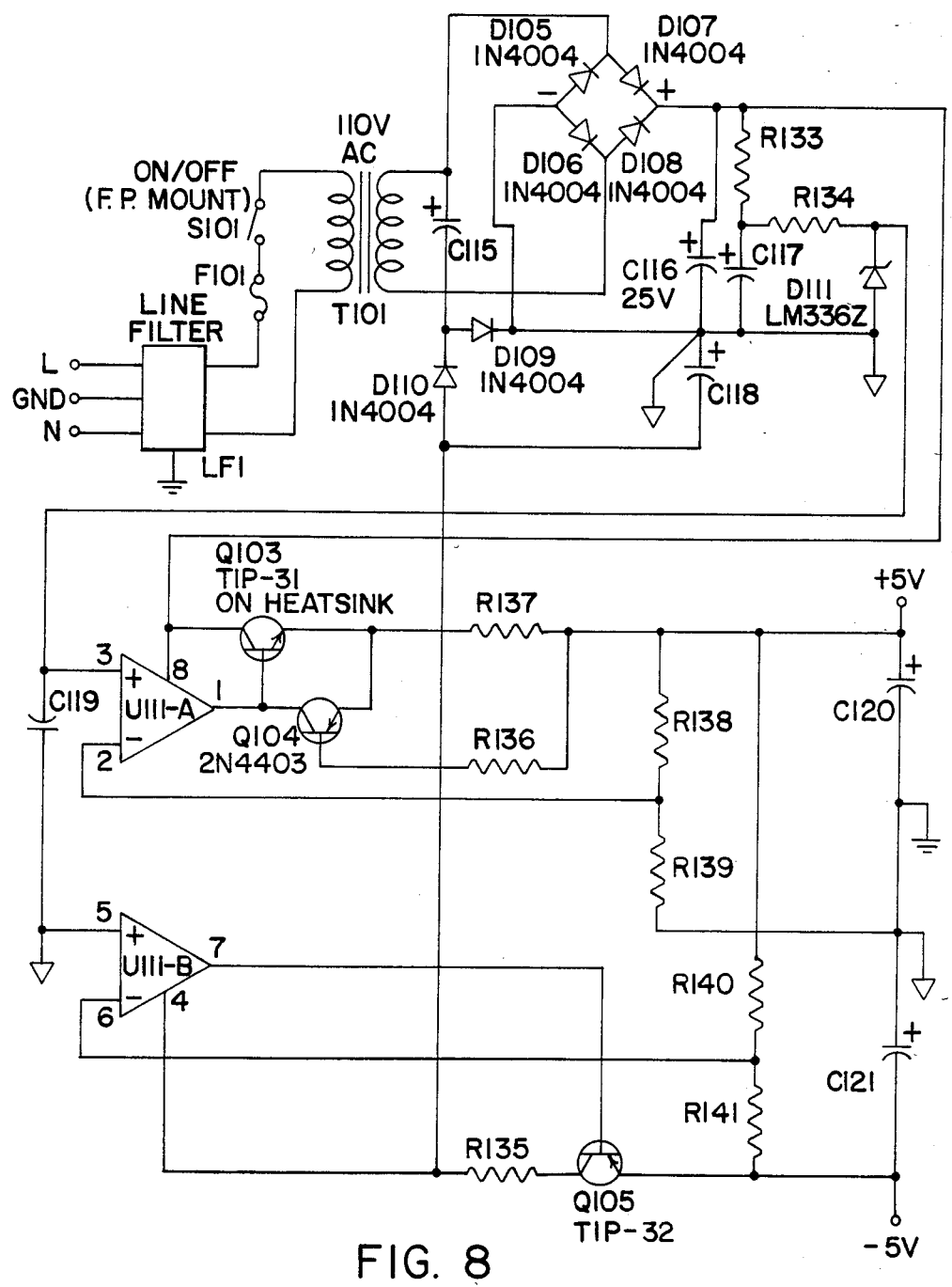

FIG. 8 is a schematic drawing of the power supply used with the present invention. The power supply is a precision bipolar supply providing a ground reference, minus 5 volts power, and plus 5 power. The power supply is conventional in design. Circuit element values are given in the table below.

| RESISTORS (in ohms) | | CAPACITORS (uf = microfarads) (pf = picofarads) | |
|---|---|---|---|
| R101 | 1k | C101 | 0.01 uf |
| R103 | 2.2k | C102 | 1 uf |
| R104 | 10k | C103 | 0.22 uf |
| R105 | 100 | C104 | 0.1 uf |
| R106 | 10k (1%) | C107 | 0.1 uf |
| R107 | 10k (1%) | C108 | 0.047 uf |
| R108 | 30.1k (1%) | C109 | 0.22 uf |
| R109 | 10k | C110 | 0.01 uf |
| R110 | 1k (1%) | C111 | 0.022 uf |
| R111 | 470 | C112 | 10 uf |
| R112 | 220 | C113 | 0.01 uf |
| R113 | 1 m | C114 | 0.1 uf |
| R114 | 2.2k | C115 | 1000 uf |
| R115 | 49.9k (1%) | C116 | 1000 uf |
| R116 | 16.2 (1%) | C117 | 100 uf |
| R117 | 4.7 m | C118 | 1000 uf |
| R118 | 2.2k | C119 | 0.1 uf |
| R119 | 10k | C120 | 22 uf |
| R120 | 499k (1%) | C121 | 22 uf |
| R121 | 47k | C122 | 0.1 uf |
| R122 | 1 m | C123 | 0.1 uf |
| R123 | 1 m | C124 | 0.1 uf |
| R124 | 1k | C125 | 0.1 uf |
| R125 | 100k | C126 | 0.1 uf |
| R126 | 10k | C127 | 0.1 uf |
| R127 | 100k | C128 | 0.001 uf |
| R128 | 100k | C201 | 100 pf |
| R129 | 10k (1%) | C202 | 0.01 uf |
| R130 | 10k (1%) | C203 | 0.1 uf |
| R131 | 47k | C204 | 0.047 uf |
| R132 | 100k | C205 | 0.22 uf |
| R133 | 470 | C206 | 0.1 uf |
| R134 | 470 | C207 | 0.1 uf |
| R135 | 27 | POTENTIOMETERS | |
| R136 | 220 | P101 | 20k |
| R137 | 1.0 | P102 | 10k |
| R138 | 1k (1%) | P103 | 25k |
| R139 | 1k (1%) | P104 | 10k |
| R140 | 1k (1%) | INTEGRATED CIRCUITS | |
| R141 | 1k (1%) | U101 | INA101AM |
| R142 | 100k (1%) | U102 | LF356N |
| R143 | 1 m | U103 | CA3140E |
| R201 | 100k | U104 | LF356N |
| R202 | 1.00k (1%) | U105 | OPO5CP |
| R203 | 4.02k (1%) | U106 | CA3140E |
| R204 | 1 m | U107 | 4066BCP |
| R205 | 180k | U108 | LM311N |
| | | U109 | 4538BCP |
| | | U110 | LF356N |
| | | U111 | OP14CP |
| | | U201 | ICL7107CPL |
| | | DSP | HP5082-7650A HP5082-7652C |

The invention has been described with reference to a preferred embodiment. Obviously, modifications and alterations will occur to others upon the reading and understanding of this specification and it is my intention to include such modifications and alterations insofar as they come within the scope of the appended claims.

Having thus described the invention, it is claimed:

1. An apparatus for measuring the output torque of an impact wrench having a driving portion delivering torque in a series of short impulses of known duration comprising a unitary beam comprised of a stationary end plate, a rod portion and a free end portion; and an adapter fixed to the free end portion of said beam adapted to receive said driving portion; said beam, adapter and driving portion having a natural period of oscillation significantly greater than said impulse duration; at least one strain gauge fixed to said rod portion and oriented to respond to angular displacement of said rod portion with a change in the resistance of said strain gauge; means producing a signal proportional to the resistance of said strain gauge; peak detector means detecting the extreme value attained by said proportional signal and holding said extreme value; means displaying said extreme value in a visually perceptible form.

2. The apparatus of claim 1 wherein said natural period of oscillation is at least eight times as long as said impulse duration.

3. The apparatus of claim 2 wherein said rod portion has a first constant cross section over its entire length, said first constant cross section having a first area and said free end portion has a second constant cross section over its entire length, said second constant cross section having a second area, and said second area being larger than said first area.

4. The apparatus of claim 1 wherein said beam free end portion is comprised of a first free end portion piece having a first modulus of elasticity and a second free end portion piece having a second modulus of elasticity, said second modulus of elasticity being less than said first modulus of elasticity.

5. The apparatus of claim 4 wherein said first free end portion piece is steel and said second free end portion piece is aluminum.

6. The apparatus of claim 1 wherein said peak detector includes a first charge accumulator and said apparatus includes a zeroing means comprising discharging means discharging said first charge accumulator and an actuator initiating said zeroing means.

7. The apparatus of claim 6 wherein said zeroing means additionally comprises comparator means comparing said peak detector output to a reference level and having an output; said output charging a second charge accumulator; and means adding a compensating level dependent on the state of charge of said second charge accumulator to the output of said peak detector.

8. The apparatus of claim 7 wherein said actuator is a momentary contact switch and said second charge accumulator is restrained from discharging when said switch is released.

9. The apparatus of claim 1 wherein a mode switch having at least two positions is provided, said mode switch causing said peak detector to hold said extreme value when said mode switch is in a first position, said mode switch causing said peak detector to have an output tracking its input when said mode switch is in a second position.

10. The apparatus of claim 9 wherein said mode switch has at least a third position, said mode switch third position causing said signal proportional to the resistance of said strain gauge to be applied to an impulse counting circuit, said impulse counting circuit providing a signal to said displaying means producing a display representative of the rate of application of impulses by said wrench.

11. The apparatus of claim 10 wherein said impulse counting circuit comprises a first monostable multivibrator producing pulses of given amplitude and duration for the impulses produced by said impact wrench; an averaging means receiving said pulses and having a varying output voltage dependent on the frequency of said pulses, and a sampling means reading the output voltage of said averaging means at a given time after the initiation of each of said first monostable multi-vibrator pulses and means conveying said reading to said displaying means.

12. The apparatus of claim 11 including counter comparator means comparing said signal proportional to the resistance of said strain gauge to a signal proportional to and less than the peak value of said signal proportional to the resistance of said strain gauge, said counter comparator means having an output dependant on the relative value of said two compared signals, counter comparator means output being applied to said monostable multi-vibrator.

13. The apparatus of claim 11 wherein said averaging means includes an averaging charge accumulator and said sampling means comprises a sampling charge accumulator and a sampling switch, said sampling switch connecting said averaging charge accumulator and said sampling charge accumulator when closed.

14. The apparatus claim 13 wherein said sampling switch is closed by a triggering circuit, said triggering circuit comprises a second monostable multivibrator triggered by the output of said first monostable multivibrator and transistor switch means opened by output pulses from said second monostable multivibrator, said transistor switch means closing said sampling switch when opened.

15. The apparatus of claim 1 wherein said beam free end is restrained within a bearing from lateral and vertical movement.

16. A method of measuring the output torque of an impact wrench having a driving portion delivering torque in a series of short impulses comprising the steps of: providing a beam fixed on its first end and accepting an adapter adapted to engage said driving portion on its second end; said beam, adapter, and driving portion having a natural period of oscillation significantly greater than the duration of said impact impulses; said beam having at least one strain gauge orientated to respond to angular displacement of said beam; engaging said impact wrench to said adapter; causing said impact wrench to apply a series of impulses to said adapter; producing a signal proportional to the response to said strain gauge; detecting extreme values of said proportional signal; and, displaying said extreme values in a visually perceptible form.

* * * * *